(12) United States Patent
Karimi et al.

(10) Patent No.: US 10,152,454 B2
(45) Date of Patent: Dec. 11, 2018

(54) METHOD AND SYSTEM FOR DECOMPOSING A PROBLEM INVOLVING DISCRETE OPTIMIZATION INTO A PLURALITY OF SMALLER SUBPROBLEMS AND USE OF THE METHOD FOR SOLVING THE PROBLEM

(71) Applicant: 1QB INFORMATION TECHNOLOGIES INC., Vancouver (CA)

(72) Inventors: Hamed Karimi, Vancouver (CA); Gilad Rosenberg, Vancouver (CA)

(73) Assignee: 1QB INFORMATION TECHNOLOGIES INC., Vancouver (CA)

( * ) Notice: Subject to any disclaimer, the term of this patent is extended or adjusted under 35 U.S.C. 154(b) by 88 days.

(21) Appl. No.: 15/447,879

(22) Filed: Mar. 2, 2017

(65) Prior Publication Data

US 2017/0255592 A1    Sep. 7, 2017

Related U.S. Application Data (60) Provisional application No. 62/302,437, filed on Mar. 2, 2016.

(51) Int. Cl.
*G06F 7/38* (2006.01)
*G06F 17/11* (2006.01)
(Continued)

(52) U.S. Cl.
CPC ............ *G06F 17/11* (2013.01); *G06N 5/025* (2013.01); *G06N 99/002* (2013.01); *G06N 99/005* (2013.01); *G06F 17/10* (2013.01)

(58) Field of Classification Search
CPC ..... G06F 17/11; G06N 99/005; G06N 99/002; G06N 5/025
(Continued)

(56) References Cited

U.S. PATENT DOCUMENTS

| 9,870,273 | B2 * | 1/2018 | Dadashikelayeh | ... G06F 9/5083 |
| 2014/0324933 | A1 * | 10/2014 | Macready | ............ G06N 99/002 708/200 |
| 2015/0205759 | A1 * | 7/2015 | Israel | ...................... G06F 17/11 703/2 |

FOREIGN PATENT DOCUMENTS

| CA | 2 881 033 A1 | 4/2015 |
| WO | WO 2016/029172 A1 | 2/2016 |

OTHER PUBLICATIONS

Vinci, Walter et al. "Quantum annealing correction with minor embedding." Physical Review A 92.4 (Jul. 2015).
(Continued)

*Primary Examiner* — Tan V. Mai
(74) *Attorney, Agent, or Firm* — Pearl Cohen Zedek Latzer Baratz LLP (57) ABSTRACT

A method is disclosed for preprocessing a problem involving discrete optimization over a plurality of variables, the method comprising obtaining an indication of a problem involving discrete optimization; converting the problem involving discrete optimization into a problem suitable for a given optimization oracle architecture of an optimization oracle; providing a given number of times M the problem suitable for the given optimization oracle architecture to the optimization oracle; for each providing of the problem, performing a given number K of calls to the optimization oracle; each call generating a given configuration; obtaining a variable selection criterion, the variable selection criterion for determining at least one variable of the plurality of generated configurations that can be fixed; determining at
(Continued)

least one variable that matches the variable selection criterion and a corresponding value for each variable; fixing the at least one determined variable at the corresponding value in the problem involving discrete optimization to thereby preprocess the problem to generate at least one subproblem and providing an indication of the at least one generated subproblem and an indication of the at least one fixed variable.

20 Claims, 4 Drawing Sheets

(51) Int. Cl.
    *G06N 5/02*     (2006.01)
    *G06N 99/00*     (2010.01)
    *G06F 17/10*     (2006.01)

(58) Field of Classification Search
    USPC .......................................................... 708/446
    See application file for complete search history.

(56) References Cited

OTHER PUBLICATIONS

Choi, Vicky. "Minor-embedding in adiabatic quantum computation: I. The parameter setting problem." Quantum Information Processing, vol. 7, No. 5 (2008): pp. 193-209.
D-Wave Systems Inc. "Developer Guide for Python", Release 2.3. D-Wave: The Quantum Computing Company™, 2016.
D-Wave Systems Inc. "Programming with QUBOs", Release 2.1. D-Wave: The Quantum Computing Company™, 2015.
Karimi et al. "Boosting Quantum Annealer Performance via Quantum Persistence", published Jun. 27, 2016. (https://www.arxiv.org/pdf/1606.07797.pdf).
Rosenberg et al. "Building an Iterative Heuristic Solver for a Quantum Annealer", Computational Optimization and Applications, 65: 845, published Apr. 23, 2016.
International Search Report of PCT Application No. PCT/IB2017/051224, dated May 18, 2017.

* cited by examiner

METHOD AND SYSTEM FOR DECOMPOSING A PROBLEM INVOLVING DISCRETE OPTIMIZATION INTO A PLURALITY OF SMALLER SUBPROBLEMS AND USE OF THE METHOD FOR SOLVING THE PROBLEM

CROSS-REFERENCE TO RELATED APPLICATION

The present patent application claims priority from U.S. Provisional Patent Application No. 62/302,437, filed on Mar. 2, 2016.

FIELD OF THE INVENTION

The invention relates to computing. More precisely, this invention pertains to a method and system for decomposing a problem involving discrete optimization into a plurality of smaller subproblems and its use for solving the problem.

BACKGROUND OF THE INVENTION

There are many interesting and significant real-world problems that can be formulated as a discrete optimization problem; for example, portfolio optimization, risk management problems such as fraud detection for online transactions, community detection in social networks, etc.

Most of these real-world problems are NP-hard in general, which means the time needed to find the optimal solution grows exponentially with the size of the problem. Thus, large-scale, practical problems cannot be addressed unless by using heuristic methods that sacrifice the optimality of the solutions to obtain efficiency.

There is a need for a method and system that will overcome at least one of the above-identified drawbacks.

Features of the invention will be apparent from review of the disclosure, drawings and description of the invention below.

BRIEF SUMMARY OF THE INVENTION

According to a broad aspect, there is disclosed a method for preprocessing a problem involving discrete optimization over a plurality of variables, the method comprising obtaining an indication of a problem involving discrete optimization; converting, using the digital computer, the problem involving discrete optimization into a problem suitable for a given optimization oracle architecture of an optimization oracle; providing, using the digital computer, a given number of times M the problem suitable for the given optimization oracle architecture to the optimization oracle; for each providing of the problem, performing, using the optimization oracle, a given number K of call to the optimization oracle, each call to the optimization oracle generating a given configuration; obtaining, using the digital computer, a variable selection criterion, the variable selection criterion for determining at least one variable of the plurality of generated configurations to be fixed; determining, using the digital computer, at least one variable that matches the variable selection criterion and a corresponding value for each variable; fixing, using the digital computer, the at least one determined variable at the corresponding value in the problem involving discrete optimization to thereby preprocess the problem to generate at least one subproblem and providing, using the digital computer, an indication of the at least one generated subproblem and an indication of the at least one fixed variable.

According to an embodiment, the problem involving discrete optimization comprises one of a quadratic unconstrained binary optimization problem and an Ising problem.

According to an embodiment, the optimization oracle comprises a quantum annealer.

According to an embodiment, the providing a given number of times M of the problem suitable for the given optimization oracle architecture to the optimization oracle is performed in parallel.

According to an embodiment, the performing a given number K of call to the optimization oracle is performed using random gauges.

According to an embodiment, the variable selection criterion is met by a given variable of the plurality of generated configurations when a corresponding value for the given variable does not change in exactly all of the plurality of generated configurations.

According to an embodiment, the variable selection criterion is met by a given variable of the plurality of generated configurations when a corresponding value for the given variable does not change in an absolute majority of the plurality of generated configurations.

According to an embodiment, the absolute majority of the plurality of generated configurations is defined by a user.

According to an embodiment, there is disclosed a method for solving a problem involving discrete optimization over a plurality of variables, the method comprising receiving, using a digital computer, an indication of a problem involving discrete optimization over a plurality of variables; until a termination criterion is met: recursively preprocessing the problem involving discrete optimization over a plurality of variables using the method disclosed herein to generate a plurality of subproblems; solving each of the generated plurality of subproblems to provide a plurality of corresponding solutions; and providing, using the digital computer, the plurality of corresponding solutions.

According to an embodiment, the termination criterion is met when a number of variables of the generated plurality of subproblems is smaller than a given number of variables.

According to an embodiment, the termination criterion is met when a reduction of a size of the problem involving discrete optimization is achieved by a given quantity.

According to an embodiment, the termination criterion is met when it is possible to solve the generated plurality of subproblems using an efficient optimization problem solver.

According to an embodiment, the solving of each of the generated plurality of subproblems is performed using the optimization oracle.

According to an embodiment, the solving of each of the generated plurality of subproblems is performed using the digital computer.

According to an embodiment, the plurality of corresponding solutions are provided to a user interacting with the digital computer.

According to an embodiment, the providing of the plurality of corresponding solutions comprises providing the plurality of corresponding solutions to another computer operatively connected to the digital computer.

According to an embodiment, the solving of each of the plurality of subproblems comprises providing, using the digital computer, a first group of at least one subproblem to the optimization oracle; obtaining, using the digital computer and from the optimization oracle, a solution for each subproblem of the first group; providing, using the digital computer, a second group of at least one subproblem to a classical solver and obtaining, using the digital computer and from the classical solver, at least one corresponding solution for each of the subproblem of the second group.

According to an embodiment, the first group of at least one subproblem and the second group of at least one subproblem are determined based on a size of the plurality of subproblems.

According to a broad aspect, there is disclosed a digital computer comprising a central processing unit; a display device; a communication port for operatively connecting the digital computer to an optimization oracle; a memory unit comprising an application for preprocessing a problem involving discrete optimization over a plurality of variables, the application comprising instructions for obtaining an indication of a problem involving discrete optimization; instructions for converting the problem involving discrete optimization into a problem suitable for a given optimization oracle architecture of the optimization oracle; instructions for providing a given number of times M the problem suitable for the given optimization oracle architecture to the optimization oracle; instructions for obtaining from the optimization oracle, for each providing of the problem, a plurality of configurations, each configuration generated by a call to the optimization oracle; instructions for obtaining a variable selection criterion, the variable selection criterion for determining at least one variable of the plurality of generated configurations to be fixed; instructions for determining at least one variable that matches the variable selection criterion and a corresponding value for each variable; instructions for fixing the at least one determined variable at the corresponding value in the problem involving discrete optimization to thereby preprocess the problem to generate at least one subproblem; and instructions for providing an indication of the at least one generated subproblem and an indication of the at least one fixed variable; and a data bus for interconnecting the central processing unit, the display device, the communication port and the memory unit.

According to a broad aspect, there is disclosed a non-transitory computer-readable storage medium for storing computer-executable instructions which, when executed, cause a digital computer to perform a method for preprocessing a problem involving discrete optimization over a plurality of variables, the method comprising obtaining an indication of a problem involving discrete optimization; converting the problem involving discrete optimization into a problem suitable for a given optimization oracle architecture of the optimization oracle; providing a given number of times M the problem suitable for the given optimization oracle architecture to the optimization oracle; obtaining from the optimization oracle, for each providing of the problem, a plurality of configurations, each configuration generated by a call to the optimization oracle; obtaining a variable selection criterion, the variable selection criterion for determining at least one variable of the plurality of generated configurations to be fixed; determining at least one variable that matches the variable selection criterion and a corresponding value for each variable; fixing the at least one determined variable at the corresponding value in the problem involving discrete optimization to thereby preprocess the problem to generate at least one subproblem; and providing an indication of the at least one generated subproblem and an indication of the at least one fixed variable.

An advantage of the method disclosed herein is that the size of a problem involving discrete optimization may be reduced by fixing the values of a subset of variables of the problem involving discrete optimization following an exploration of sub-optimal or near-optimal solutions. As a consequence, the problem may be reduced to at least one subproblem involving discrete optimization. This solves the technical problem of solving a problem involving discrete optimization and that has a large size.

An advantage of the method disclosed herein is that it enables the decomposing of a large problem into smaller subproblems using a suboptimal oracle. Another advantage of the method disclosed herein is that it solves the technical problem of not being able to use a suboptimal oracle to solve a large problem involving discrete optimization.

Another advantage of the method disclosed herein is that it can improve significantly the processing of a system used for solving an optimization problem by advantageously decomposing a large problem involving discrete optimization into smaller subproblems.

BRIEF DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION OF THE INVENTION

In the following description of the embodiments, references to the accompanying drawings are by way of illustration of an example by which the invention may be practiced.

Terms

The term "invention" and the like mean "the one or more inventions disclosed in this application," unless expressly specified otherwise.

The terms "an aspect," "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the disclosed invention(s)," unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an" and "the" mean "one or more," unless expressly specified otherwise.

The term "plurality" means "two or more," unless expressly specified otherwise.

The term "herein" means "in the present application, including anything which may be incorporated by reference," unless expressly specified otherwise.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example," and thus do not limit the terms or phrases they explain. For example, in a sentence "the computer sends data (e.g., instructions, a data structure) over the Internet," the term "e.g." explains that "instructions" are an example of "data" that the computer may send over the Internet, and also explains that "a data structure" is an example of "data" that the computer may send over the Internet. However, both "instructions" and "a data structure" are merely examples of "data," and other things besides "instructions" and "a data structure" can be "data."

The term "i.e." and like terms mean "that is," and thus limit the terms or phrases they explain.

The term "discrete optimization problem" mean a problem where the variables of the problem take discrete values, as opposed to continuous values.

The term "optimization oracle" and like terms mean a machine or an algorithm that can produce near-optimal (i.e., sub-optimal) solutions for optimization problem.

The term "landscape" and like terms mean the set of all possible feasible configurations of variables of an optimization problem.

The term "near-optimal landscape" and the term "sub-optimal landscape" means the set of all possible feasible configurations of variables of an optimization problem where their objective function value is close enough to the value of the optimal solution.

The term "suboptimal oracle" and like terms mean an oracle that returns the optimal solution with some probability, and otherwise returns a suboptimal solution (meaning non-optimal but near optimal solution).

Neither the Title nor the Abstract is to be taken as limiting in any way as the scope of the disclosed invention(s). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

It will be appreciated that the invention may be implemented in numerous ways, including a method, a system, a computer-readable medium such as a computer-readable storage medium. In this specification, these implementations, or any other form that the invention may take, may be referred to as systems or techniques. A component such as a processor or a memory described as being configured to perform a task includes either a general component that is temporarily configured to perform the task at a given time or a specific component that is manufactured to perform the task.

With all this in mind, the present invention is directed to a method and system for decomposing a problem involving discrete optimization into a plurality of smaller subproblems and its use for solving the problem involving discrete optimization.

Figure 1:
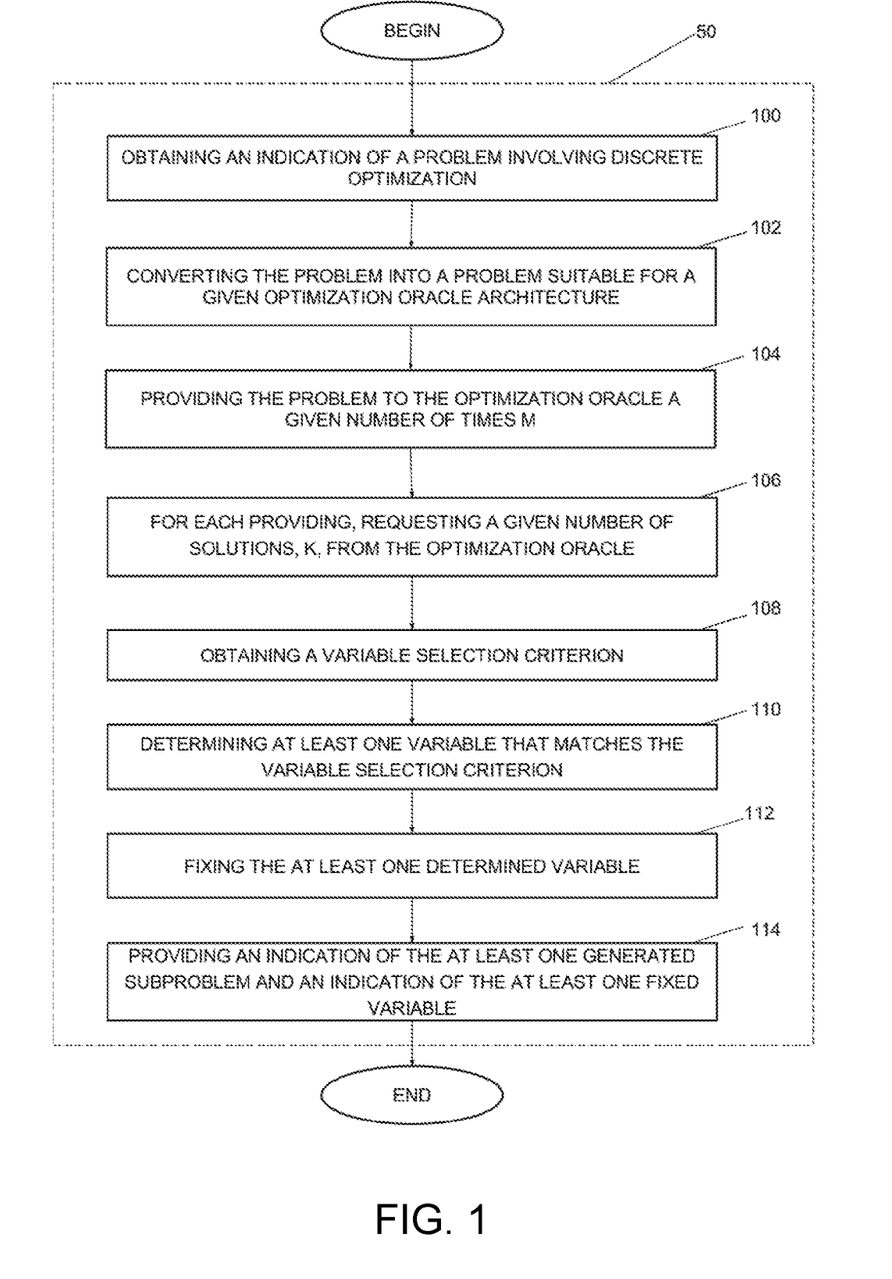
FIG. 1 is a flowchart that shows an embodiment of a method for preprocessing a problem involving discrete optimization into at least one subproblem involving discrete optimization.

Now referring to FIG. 1 and according to processing step 100, an indication of a problem involving discrete optimization is obtained as an input.

It will be appreciated that the problem involving discrete optimization may be of various types. In fact, the problem involving discrete optimization may be a non-linear integer programming problem.

In one embodiment, the problem involving discrete optimization comprises a quadratic unconstrained optimization (QUBO) problem.

In one embodiment, the indication of a problem involved discrete optimization is received using the digital computer.

In an alternative embodiment, the problem involving discrete optimization comprises an Ising problem.

According to processing step 102, the problem involving discrete optimization is converted into a problem suitable for a given optimization oracle architecture of an optimization oracle.

In one embodiment, the problem involving discrete optimization is converted into a problem suitable for a given optimization oracle architecture of an optimization oracle using a digital computer.

In one embodiment, the optimization oracle is quantum annealer, such as the D-Wave 2X machine. In another alternative embodiment, the optimization oracle is selected from a group consisting of a simulated annealing algorithm, a path integral quantum Monte-Carlo algorithm and a parallel tempering algorithm.

In such embodiment, the quadratic unconstrained optimization (QUBO) problem or Ising problem is transformed into an Ising problem compatible with the structure of the D-Wave 2X machine.

It will be appreciated that a problem might need to use minor embedding to transform the problem into an architecture-compatible (of the optimization oracle) problem.

It will be appreciated that following this processing step, the optimization oracle is used to explore sub-optimal or near-optimal landscapes of the problem involving discrete optimization in order to obtain an indication of variables that can be fixed, as further explained below.

In fact, it will be appreciated that the purpose of the exploring of the sub-optimal landscapes is to find out the variables of the problem involving discrete optimization that can be fixed using an optimization oracle.

More precisely and according to processing step 104, the problem suitable for the given optimization oracle architecture is provided to the optimization oracle a given number of times M.

It will be appreciated that in one embodiment, the M queries from the optimization oracle are performed in parallel.

It will be appreciated that in another embodiment, the M queries are sent to the optimization oracle at once.

In one embodiment, the problem suitable for the given optimization oracle architecture is provided to the optimization oracle using the digital computer.

According to processing step 106, a given number K of call to the optimization oracle is performed for each providing of the problem suitable for the given optimization oracle architecture to the optimization oracle.

It will be appreciated that each call to optimization oracle generates a given configuration, also referred to as a state or solution.

In one embodiment, the D-Wave 2X quantum annealer is used as the optimization oracle and the problem suitable for the given optimization oracle architecture is sent M times with K annealing cycles at each time. It will be appreciated that in one embodiment random gauges are used in each call to the quantum annealer, in order to achieve a better performance on the machine and consequently achieve a faster and better decomposition of the input problem.

It will be appreciated by the skilled addressee that a random gauge is a reversible transformation of a problem into an equivalent problem. The transformed problem has a different answer but because the transformation is reversible, the transformed problem can be solved and then reversed to the answer of the original problem.

It has been contemplated that the performance can be improved significantly when using random gauges each time the quantum annealer is called.

It will be appreciated that M*K configurations are then obtained from the quantum annealer.

It will be appreciated by the skilled addressee that another optimization oracle may be used in an alternative embodiment to provide a sample of sub-optimal or near-optimal solutions.

According to processing step 108, a variable selection criterion is obtained.

It will be appreciated that the variable selection criterion is used for determining at least one variable of the plurality of generated configurations that can be fixed.

In one embodiment, the variable selection criterion is obtained using the digital computer.

It will be appreciated that various embodiments may be provided for the variable selection criterion.

In one embodiment, the variable selection criterion returns only a group of configurations with the lowest objective function value, such that at least 30% of the variables are selected.

In one embodiment, the variable selection criterion is met by a given variable of the plurality of generated configurations when a corresponding value for the given configuration does not change in exactly all of the plurality of generated configurations.

In one embodiment, the variable selection criterion takes into consideration only the configurations that are returned from a configuration selection criterion, and is met by a variable when a corresponding value does not change in exactly all of those configurations. It will be appreciated by the skilled addressee that the configuration selection criterion can be defined by the user. In one embodiment, the configuration selection criterion returns only the 20$^{th}$ percentile of configurations by objective function value.

In the case where the optimization oracle is the D-Wave 2X quantum annealer, qubits that maintains their state or value in all of the M*K configurations are selected.

In an alternative embodiment, the variable selection criterion takes into consideration all the configurations obtained and is met by at least one given variable when the corresponding value for the at least one given variable does not change in an absolute majority of the configurations. It will be appreciated by the skilled addressee that the absolute majority may be defined by the user in one embodiment. In one embodiment, the absolute majority is defined as 99% of the configurations.

It will be appreciated that transforming a problem involving discrete optimization into a problem suitable for a given optimization oracle architecture will affect and impose constraints on an acceptance criteria of observed values of different variables sampled by the optimization oracle.

In one embodiment, the optimization oracle is the D-Wave 2X quantum annealer and, for a general problem, an embedding might be required. As known to the skilled addressee, an embedding process may require a creation of a chain of physical qubits, as a representation of the logical qubits. To fix the value of logical qubits, the majority voting of the variables obtained may be used (Minor-Embedding in Adiabatic Quantum Computation: I. The Parameter Setting Problem. Quantum Information Processing, Volume 7, Number 5, 2008, pp. 193-209. arXiv:quant-ph/0804.4884). It will be appreciated by the skilled addressee that there may be different methods for fixing the value of logical qubits. In an alternative embodiment, this is achieved by iteratively assigning values such that the energy is minimized (Quantum Annealing Correction with Minor Embedding, Phy. Rev. A 92, 042310 (2015), arXiv:quant-ph/1507.0265).

In one embodiment, the D-Wave 2X quantum annealer is used as the optimization oracle and a logical qubit is represented with a chain of 7 physical qubits. From the results of this processing step and in one embodiment, it has been found that 4 qubits out of those 7 qubits in the chain maintained their values in all configurations. As a result of this, the value of the logical qubit was fixed to the value of that majority of 4 qubits.

According to processing step 110, at least one variable that matches the variable selection criterion and a corresponding value for each variable are determined.

It will be appreciated that the determining of the at least one variable that matches the variable selection criterion and a corresponding value for each variable is performed using the digital computer in one embodiment.

According to processing step 112, the at least one determined variable is fixed at the corresponding value in the problem involving discrete optimization to thereby preprocess the problem to generate at least one subproblem.

In one embodiment, this processing step is performed using the digital computer.

According to processing step 114, an indication of the at least one generated subproblem and an indication of the at least one fixed variable are provided.

In one embodiment, the indication of the at least one generated subproblem and the indication of the at least one fixed variable are provided using the digital computer.

It will be appreciated that in one embodiment the size of the problem may be reduced by 50% when such preprocessing is performed.

Figure 2:
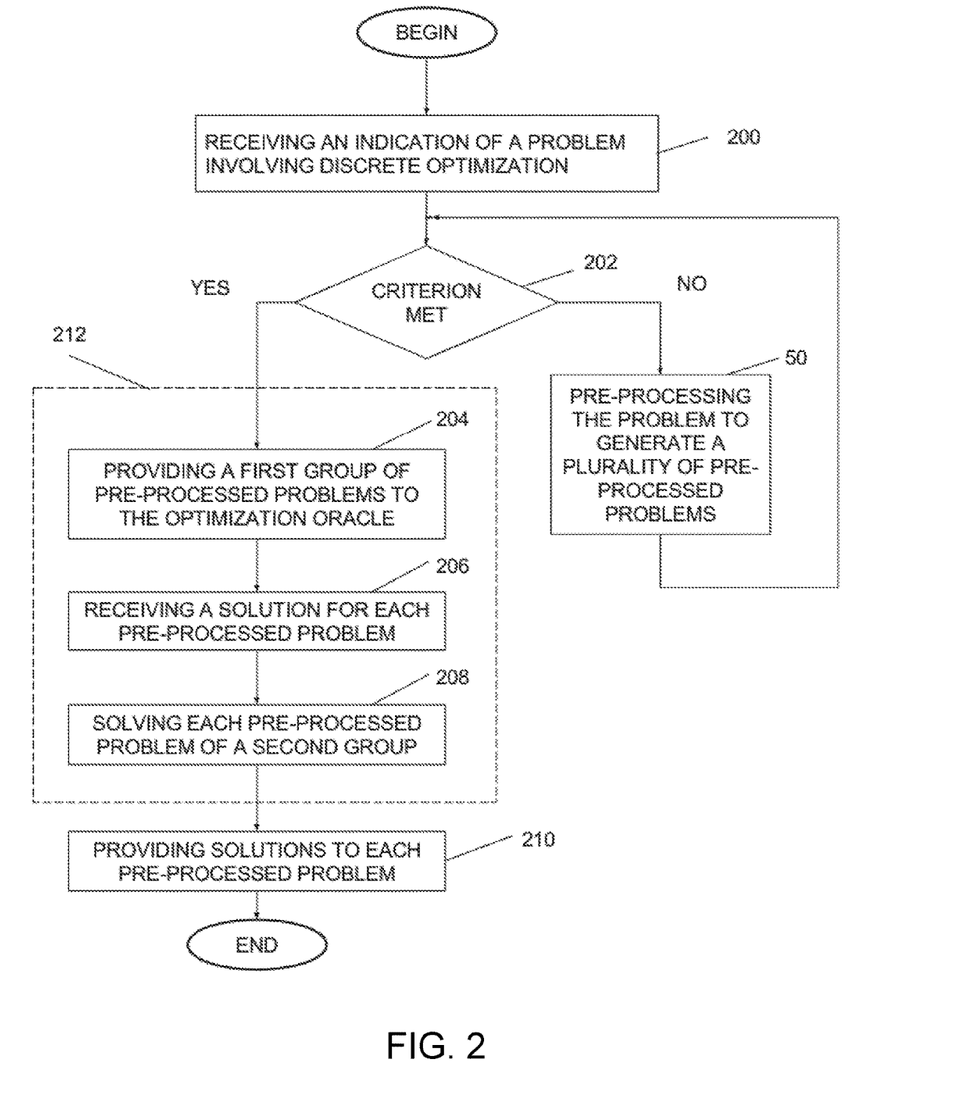
FIG. 2 is a flowchart that shows an embodiment of a method for solving a problem involving discrete optimization in which the preprocessing method disclosed in FIG. 1 is performed recursively.

Now referring to FIG. 2, there is shown an embodiment of a method for solving a problem involving discrete optimization over a plurality of variables. As explained below, the method takes advantage of the preprocessing disclosed in FIG. 1.

According to processing step 200, an indication of a problem involving discrete optimization over a plurality of variables is received.

In one embodiment, the indication of a problem involving discrete optimization over a plurality of variables is received using a digital computer.

According to processing step 202, a test is performed in order to find out if a termination criterion is met.

In one embodiment, the termination criterion is a user-defined termination criterion.

The termination criterion is used for determining when no further preprocessing step should be performed. As explained above, the preprocessing step will be recursively applied in order to reduce the size of a problem involving discrete optimization to a given smaller size. The preprocessing step can further be applied to the results from the first preprocessing in order to further reduce the size.

For instance, the termination criterion may be defined such that no further preprocessing step is performed if the subproblem has a number of variables smaller than a given number of variables, such as, for instance, ten (10) variables. The skilled addressee will appreciate that the given number of variables could be another number.

In an alternative embodiment, the termination criterion is defined such that the preprocessing step achieves a reduction of a size of the problem involving discrete optimization by a specified percentage. For instance, if the problem size is not reduced by at least 5%, the recursion is completed.

In another alternative embodiment, the termination criterion is defined such that no further preprocessing is performed if a resulting subproblem has a complexity such that it can be solved using an efficient optimization problem solver; i.e., that it can be solved in polynomial time. This can be the case for instance if the resulting subproblem has a planar structure.

In the case where the termination criterion is not met and according to processing step 50, the problem is preprocessed to generate a plurality of subproblems.

In one embodiment, the problem is preprocessed according to the method disclosed in FIG. 1.

As explained above, it will be appreciated that at least one subproblem is created following the preprocessing of the problem. Reapplying a preprocessing to the at least one subproblem will create at least one subproblem. As explained, the preprocessing is applied recursively to the subsequent subproblem(s) until the termination criterion is met. A plurality of subproblems are then obtained as a result.

In accordance with processing step 212, the plurality of subproblems are solved.

It will be appreciated that the plurality of subproblems may be solved according to various embodiments.

In particular one embodiment for solving the plurality of subproblems is disclosed in processing steps 204, 206 and 208.

More precisely and in the case where the termination criterion is met and according to processing step 204, a first group of subproblems is provided to the optimization oracle.

In fact it will be appreciated that it may be pertinent to solve certain problems using the optimization oracle while other problems may be solved using the digital computer. A first group of subproblems may be therefore provided to the optimization oracle while a second group of subproblems may be provided to the digital computer.

In one embodiment, the determination as to whether a subproblem belongs to a given group or another may be based on a size of the subproblem. For instance, the first group may be comprised of problems having a size of 15 or more variables. The second group may be comprised with subproblems having a size of fewer than 15 variables.

It will be appreciated that any combination of user-input decision criteria may be used to specify the solver for each of the resulting subproblems.

In fact, it will be appreciated that, in one embodiment, the size of the subproblem may be so small that an exhaustive search may be able to solve it efficiently.

It will be appreciated that, in an alternative embodiment, the size of the problem may be small enough that a heuristic may solve it to optimality efficiently, with a high probability of success.

It will be appreciated that, in an alternative embodiment, the size of the problem may be small enough that a branch and bound algorithm may solve it efficiently.

It will be appreciated that the subproblem may also have an alternative architecture that will put it in a lower complexity class. The subproblem may be solved with case-specific algorithms.

It will be appreciated that in an alternative embodiment, the subproblem may have a planar graph structure. For many families of optimization problems, having a planar graph structure is equivalent to being a very easy and low-complexity problem. So, an algorithm may be found that solves these instances in polynomial time.

It will be appreciated that in an alternative embodiment, the subproblem may have a representation that makes it easier for the same optimization oracle, in this embodiment the quantum annealer, to solve it.

A problem may be too large to begin with that is hard for the quantum annealer to solve exactly. But the quantum annealer still makes good (suboptimal) guesses close to the actual answer. The disclosed method may be used to use those suboptimal answers from the quantum annealer to decompose the original problem into smaller subproblems. The smaller subproblems may have properties that put them into the sweet spot of the quantum annealer; for example they are definitely smaller than the original problem. This means the same quantum annealer may have a better chance of solving these problems exactly. If it cannot, the same process iterative can be used to decompose the subproblems into smaller pieces.

In one embodiment, the first group of subproblems is provided to an optimization oracle using the digital computer.

According to processing step 206, a solution is received for each subproblem.

In one embodiment, the solution is received by the digital computer from the optimization oracle.

Still referring to FIG. 2 and according to processing step 208, each subproblem of a second group is solved.

In one embodiment, each subproblem of the second group is solved using the digital computer.

While there has been disclosed one embodiment for solving the plurality of subproblems, it will be appreciated that the plurality of subproblems may be solved according to various other embodiments.

For instance, the plurality of subproblems may be solved using only the optimization oracle in an alternative embodiment.

In another alternative embodiment, the plurality of subproblems may be solved using only the digital computer if the subproblems are simple enough.

According to processing step 210, solutions for each of the plurality of subproblems are provided.

It will be appreciated that the solutions for each of the plurality of subproblems may be provided according to various embodiments.

In one embodiment, the solutions for each of the plurality of subproblems are provided to the user interacting with the digital computer.

In an alternative embodiment, the solutions for each of the plurality of subproblems are provided to another computer operatively connected to the digital computer.

Figure 3:
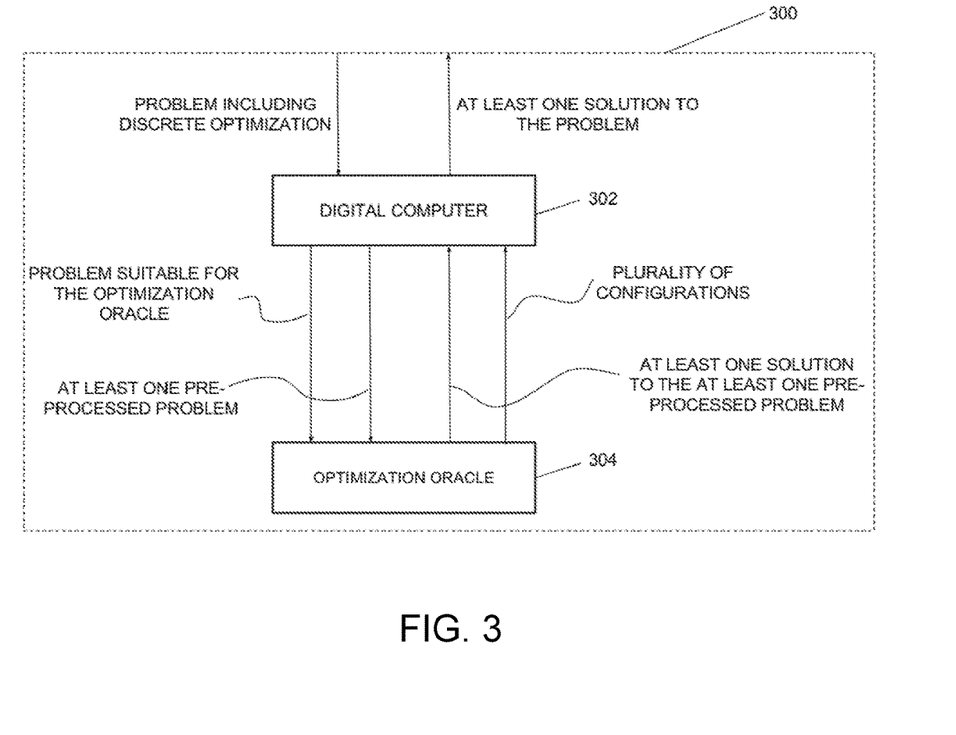
FIG. 3 is a block diagram that shows an embodiment of a system in which the method for solving a problem involving discrete optimization may be implemented. The system comprises a digital computer and an optimization oracle.

Now referring to FIG. 3, there is shown an embodiment of a system 300 in which an embodiment of the method for solving a problem involving discrete optimization over a plurality of variables may be implemented.

The system 300 comprises a digital computer 302 and an optimization oracle 304.

The digital computer 302 receives a problem involving discrete optimization and provides at least one solution.

It will be appreciated that the problem involving discrete optimization may be provided according to various embodiments.

In one embodiment, the problem involving discrete optimization is provided by a user interacting with the digital computer 302.

Alternatively, the problem involving discrete optimization is provided by another computer, not shown, operatively connected to the digital computer 302.

Alternatively, the problem involving discrete optimization is provided by an independent software package.

Alternatively, the problem involving discrete optimization is provided by an intelligent agent.

Similarly, it will be appreciated that the at least one solution may be provided according to various embodiments.

In accordance with an embodiment, the at least one solution is provided to the user interacting with the digital computer 302.

Alternatively, the at least one solution is provided to another computer operatively connected to the digital computer 302.

In fact, it will be appreciated by the skilled addressee that the digital computer 302 may be any type of computer.

In one embodiment, the digital computer 302 is selected from a group consisting of desktop computers, laptop computers, tablet PCs, servers, smartphones, etc.

Figure 4:
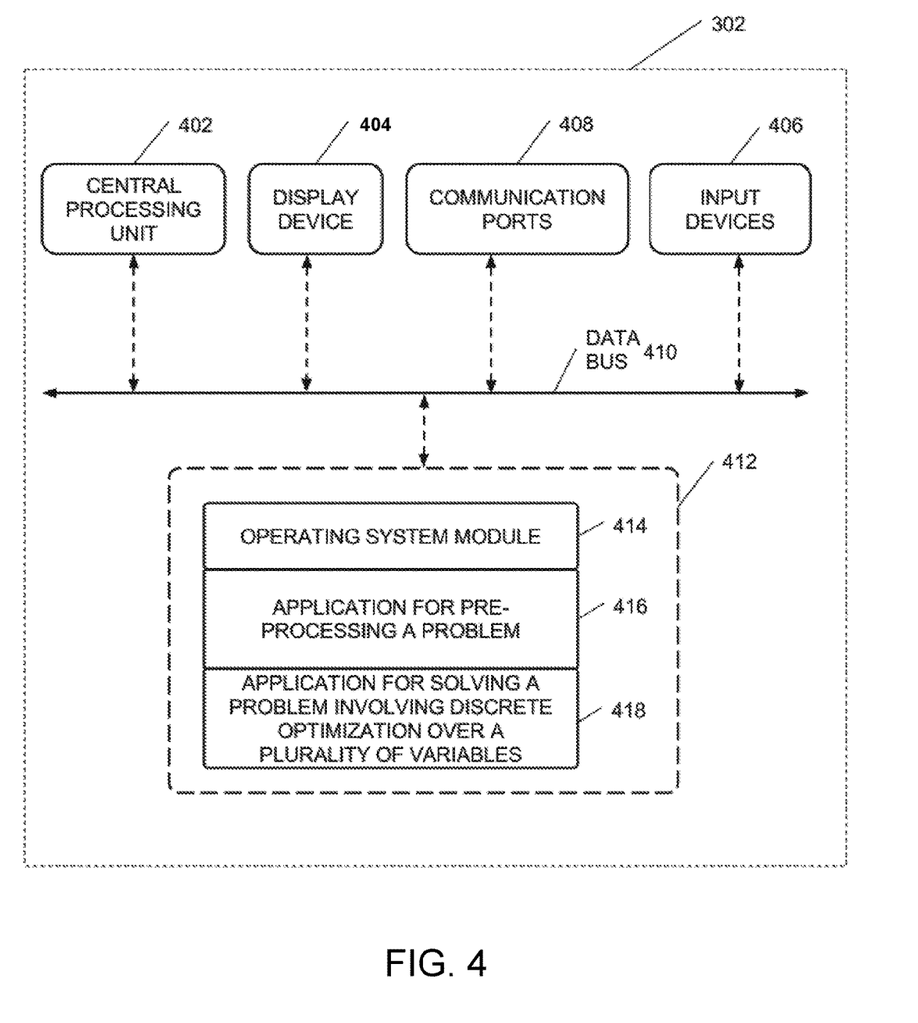
FIG. 4 is a block diagram that shows an embodiment of a digital computer that can be used in the system disclosed in FIG. 3.

Now referring to FIG. 4, there is shown an embodiment of a digital computer 302. It will be appreciated that the digital computer 302 may also be broadly referred to as a processor.

In this embodiment, the digital computer 302 comprises a central processing unit (CPU) 402, also referred to as a microprocessor, a display device 404, input devices 406, communication ports 408, a data bus 410 and a memory unit 412.

The CPU 402 is used for processing computer instructions. The skilled addressee will appreciate that various embodiments of the CPU 402 may be provided.

In one embodiment, the central processing unit 402 is a CPU Core i7 3820 running at 3.6 GHz and manufactured by Intel™.

The display device 404 is used for displaying data to a user. The skilled addressee will appreciate that various types of display device 404 may be used.

In one embodiment, the display device 404 is a standard liquid-crystal display (LCD) monitor.

The communication ports 408 are used for sharing data with the digital computer 302.

The communication ports 408 may comprise, for instance, a universal serial bus (USB) port for connecting a keyboard and a mouse to the digital computer 302.

The communication ports 408 may further comprise a data network communication port such as an IEEE 802.3 port for enabling a connection of the digital computer 302 with another computer via a data network.

The skilled addressee will appreciate that various alternative embodiments of the communication ports 408 may be provided.

In one embodiment, the communication ports 408 comprise an Ethernet port and a mouse port (e.g., Logitech™).

The memory unit 412 is used for storing computer-executable instructions.

It will be appreciated that the memory unit 412 comprises, in one embodiment, an operating system module 414.

It will be appreciated by the skilled addressee that the operating system module 414 may be of various types.

In an embodiment, the operating system module 414 is Windows™ 8 manufactured by Microsoft™.

The memory unit 412 further comprises an application for preprocessing a problem involving discrete optimization over a plurality of variables 416.

The application for preprocessing a problem involving discrete optimization over a plurality of variables 416 comprises instructions for converting the problem involving discrete optimization into a problem suitable for a given optimization oracle architecture of the optimization oracle.

The application for preprocessing a problem involving discrete optimization over a plurality of variables 416 further comprises instructions for providing a given number of times M the problem suitable for the given optimization oracle architecture to the optimization oracle.

The application for preprocessing a problem involving discrete optimization over a plurality of variables 416 further comprises instructions for obtaining from the optimization oracle, for each providing of the problem, a plurality of configurations, each configuration generated by a call to the optimization oracle.

The application for preprocessing a problem involving discrete optimization over a plurality of variables 416 further comprises instructions for obtaining a variable selection criterion, the variable selection criterion for determining at least one variable that can be fixed using the plurality of generated configurations.

The application for preprocessing a problem involving discrete optimization over a plurality of variables 416 further comprises instructions for determining at least one variable that matches the variable selection criterion and a corresponding value for each variable.

The application for preprocessing a problem involving discrete optimization over a plurality of variables 416 further comprises instructions for fixing the at least one determined variable at the corresponding value in the problem involving discrete optimization to thereby preprocess the problem to generate at least one subproblem.

The application for preprocessing a problem involving discrete optimization over a plurality of variables 416 further comprises instructions for providing an indication of the at least one generated subproblem and an indication of the at least one fixed variable.

The memory unit 412 further comprises an application for solving a problem involving discrete optimization over a plurality of variables 418.

The application for solving a problem involving discrete optimization over a plurality of variables 418 comprises instructions for receiving an indication of a problem involving discrete optimization over a plurality of variables.

The application for solving a problem involving discrete optimization over a plurality of variables 418 comprises instructions for preprocessing the problem involving discrete optimization using the application for preprocessing a problem involving discrete optimization over a plurality of variables 416.

The application for solving a problem involving discrete optimization over a plurality of variables 418 further comprises instructions for providing a first group of at least one subproblem to the optimization oracle.

The application for solving a problem involving discrete optimization over a plurality of variables 418 further comprises instructions for obtaining a solution for each subproblem of the first group.

The application for solving a problem involving discrete optimization over a plurality of variables 418 further comprises instructions for providing a second group of at least one subproblem to an efficient optimization problem solver. In one embodiment, the efficient optimization problem solver is the digital computer 302.

The application for solving a problem involving discrete optimization over a plurality of variables 418 further comprises instructions for obtaining at least one corresponding solution for each of the at least one subproblem of the second group.

The application for solving a problem involving discrete optimization over a plurality of variables 418 further comprises instructions for providing the at least one corresponding solution to each of the at least one subproblem of the first group and the at least one corresponding solution to each of the at least one subproblem of the second group.

Each of the central processing unit 402, the display device 404, the input devices 406, the communication ports 408 and the memory unit 412 is interconnected via the data bus 410.

Now referring back to FIG. 3, it will be appreciated that the optimization oracle 304 is operatively connected to the digital computer 302.

It will be appreciated that the coupling of the optimization oracle 304 to the digital computer 302 may be achieved according to various embodiments.

In one embodiment, the coupling of the optimization oracle 304 to the digital computer 302 is achieved via a data network.

It will be appreciated that the optimization oracle 304 may be of various types.

In one embodiment, the optimization oracle 304 is manufactured by D-Wave Systems Inc. More information on this embodiment of a quantum annealer applicable to 304 may be found at http://www.dwavesys.com. The skilled addressee will appreciate that various alternative embodiments may be provided for the optimization oracle 304.

More precisely, the optimization oracle 304 receives a problem suitable for the given optimization oracle from the digital computer 302.

The optimization oracle 304 is capable of solving the problem suitable for the given optimization oracle and of providing a plurality of configurations.

The plurality of configurations is provided by the optimization oracle 304 to the digital computer 302.

It will be appreciated that a non-transitory computer-readable storage medium is further disclosed. The non-transitory computer-readable storage medium is used for storing computer-executable instructions which, when executed, cause a digital computer to perform a method for preprocessing a problem involving discrete optimization over a plurality of variables, the method comprising converting the problem involving discrete optimization into a problem suitable for a given optimization oracle architecture of the optimization oracle; providing a given number of times M the problem suitable for the given optimization oracle architecture to the optimization oracle; obtaining from the optimization oracle, for each providing of the problem, a plurality of configurations, each configuration generated by a call to the optimization oracle; obtaining a variable selection criterion, the variable selection criterion for determining at least one variable that can be fixed using the plurality of generated configurations; determining at least one variable that matches the variable selection criterion and a corresponding value for each variable; fixing the at least one determined variable at the corresponding value in the problem involving discrete optimization to thereby preprocess the problem to generate at least one subproblem; and providing an indication of the at least one generated subproblem and an indication of the at least one fixed variable.

Although the above description relates to specific embodiments as presently contemplated by the inventors, it will be understood that the invention in its broad aspect includes functional equivalents of the elements described herein.

The invention claimed is:

1. A method for preprocessing a problem involving discrete optimization over a plurality of variables, the method comprising:

obtaining, using a digital computer, an indication of a problem involving discrete optimization;

converting, using the digital computer, the problem involving discrete optimization into a problem suitable for a given optimization oracle architecture of an optimization oracle;

providing, using the digital computer, a given number of times M the problem suitable for the given optimization oracle architecture to the optimization oracle;

for each providing of the problem, performing, using the optimization oracle, a given number K of call to the optimization oracle, each call to the optimization oracle generating a given configuration;

obtaining, using the digital computer, a variable selection criterion, the variable selection criterion for determining at least one variable of the plurality of generated configurations to be fixed;

determining, using the digital computer, at least one variable that matches the variable selection criterion and a corresponding value for each variable;

fixing, using the digital computer, the at least one determined variable at the corresponding value in the problem involving discrete optimization to thereby preprocess the problem to generate at least one subproblem; and providing, using the digital computer, an indication of the at least one generated subproblem and an indication of the at least one fixed variable.

2. The method as claimed in claim 1, wherein the problem involving discrete optimization comprises one of a quadratic unconstrained binary optimization problem and an Ising problem.

3. The method as claimed in claim 1, wherein the optimization oracle comprises a quantum annealer.

4. The method as claimed in claim 3, wherein the performing a given number K of call to the optimization oracle is performed using random gauges.

5. The method as claimed in claim 1, wherein the providing a given number of times M of the problem suitable for the given optimization oracle architecture to the optimization oracle is performed in parallel.

6. The method as claimed in claim 1, wherein the variable selection criterion is met by a given variable of the plurality of generated configurations when a corresponding value for the given variable does not change in exactly all of the plurality of generated configurations.

7. The method as claimed in claim 1, wherein the variable selection criterion is met by a given variable of the plurality of generated configurations when a corresponding value for the given variable does not change in an absolute majority of the plurality of generated configurations.

8. The method as claimed in claim 7, wherein the absolute majority of the plurality of generated configurations is defined by a user.

9. A method for solving a problem involving discrete optimization over a plurality of variables, the method comprising:
receiving, using a digital computer, an indication of a problem involving discrete optimization over a plurality of variables;
until a termination criterion is met:
recursively preprocessing the problem involving discrete optimization over a plurality of variables using the method claimed in claim 1 to generate a plurality of subproblems;
solving each of the generated plurality of subproblems to provide a plurality of corresponding solutions; and
providing, using the digital computer, the plurality of corresponding solutions.

10. The method for solving a problem involving discrete optimization over a plurality of variables as claimed in claim 9, wherein the termination criterion is met when a number of variables of the generated plurality of subproblems is smaller than a given number of variables.

11. The method for solving a problem involving discrete optimization over a plurality of variables as claimed in claim 9, wherein the termination criterion is met when a reduction of a size of the problem involving discrete optimization is achieved by a given quantity.

12. The method for solving a problem involving discrete optimization over a plurality of variables as claimed in claim 9, wherein the termination criterion is met when it is possible to solve the generated plurality of subproblems using an efficient optimization problem solver.

13. The method for solving a problem involving discrete optimization over a plurality of variables as claimed in claim 9, wherein the solving of each of the generated plurality of subproblems is performed using the optimization oracle.

14. The method for solving a problem involving discrete optimization over a plurality of variables as claimed in claim 9, wherein the solving of each of the generated plurality of subproblems is performed using the digital computer.

15. The method for solving a problem involving discrete optimization over a plurality of variables as claimed in claim 9, wherein the plurality of corresponding solutions are provided to a user interacting with the digital computer.

16. The method for solving a problem involving discrete optimization over a plurality of variables as claimed in claim 9, wherein the providing of the plurality of corresponding solutions comprises providing the plurality of corresponding solutions to another computer operatively connected to the digital computer.

17. The method for solving a problem involving discrete optimization over a plurality of variables as claimed in claim 9, wherein the solving of each of the plurality of subproblems comprises:
providing, using the digital computer, a first group of at least one subproblem to the optimization oracle;
obtaining, using the digital computer and from the optimization oracle, a solution for each subproblem of the first group;
providing, using the digital computer, a second group of at least one subproblem to a classical solver; and
obtaining, using the digital computer and from the classical solver, at least one corresponding solution for each of the subproblem of the second group.

18. The method for solving a problem involving discrete optimization over a plurality of variables as claimed in claim 17, wherein the first group of at least one subproblem and the second group of at least one subproblem are determined based on a size of the plurality of subproblems.

19. A digital computer comprising:
a central processing unit;
a display device;
a communication port for operatively connecting the digital computer to an optimization oracle;
a memory unit comprising an application for preprocessing a problem involving discrete optimization over a plurality of variables, the application comprising:
instructions for obtaining an indication of a problem involving discrete optimization;
instructions for converting the problem involving discrete optimization into a problem suitable for a given optimization oracle architecture of the optimization oracle,
instructions for providing a given number of times M the problem suitable for the given optimization oracle architecture to the optimization oracle,
instructions for obtaining from the optimization oracle, for each providing of the problem, a plurality of configurations, each configuration generated by a call to the optimization oracle,
instructions for obtaining a variable selection criterion, the variable selection criterion for determining at least one variable of the plurality of generated configurations to be fixed,
instructions for determining at least one variable that matches the variable selection criterion and a corresponding value for each variable, and
instructions for fixing the at least one determined variable at the corresponding value in the problem involving discrete optimization to thereby preprocess the problem to generate at least one subproblem; and
instructions for providing an indication of the at least one generated subproblem and an indication of the at least one fixed variable; and
a data bus for interconnecting the central processing unit, the display device, the communication port and the memory unit.

20. A non-transitory computer-readable storage medium for storing computer-executable instructions which, when executed, cause a digital computer to perform a method for preprocessing a problem involving discrete optimization over a plurality of variables, the method comprising:
obtaining an indication of a problem involving discrete optimization;

converting the problem involving discrete optimization into a problem suitable for a given optimization oracle architecture of the optimization oracle;

providing a given number of times M the problem suitable for the given optimization oracle architecture to the optimization oracle;

obtaining from the optimization oracle, for each providing of the problem, a plurality of configurations, each configuration generated by a call to the optimization oracle;

obtaining a variable selection criterion, the variable selection criterion for determining at least one variable of the plurality of generated configurations to be fixed;

determining at least one variable that matches the variable selection criterion and a corresponding value for each variable;

fixing the at least one determined variable at the corresponding value in the problem involving discrete optimization to thereby preprocess the problem to generate at least one subproblem; and providing an indication of the at least one generated subproblem and an indication of the at least one fixed variable.

\* \* \* \* \*